US009219567B2

United States Patent
Kim et al.

(10) Patent No.: US 9,219,567 B2
(45) Date of Patent: Dec. 22, 2015

(54) CONVERGED PON FOR TDMA-PON SERVICE BASED ON OFDMA-PON

(71) Applicant: Electronics and Telecommunications Research Institute, Daejeon (KR)

(72) Inventors: Kwang Ok Kim, Jeonbuk (KR); Seung-Hyun Cho, Daejeon (KR); Jie Hyun Lee, Daejeon (KR); Seung Il Myong, Daejeon (KR); Sang Soo Lee, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 165 days.

(21) Appl. No.: 13/729,638

(22) Filed: Dec. 28, 2012

(65) Prior Publication Data

US 2013/0170837 A1     Jul. 4, 2013

(30) Foreign Application Priority Data

Dec. 30, 2011 (KR) ........................ 10-2011-0147649

(51) Int. Cl.
| | | |
|---|---|---|
| *H04J 14/02* | (2006.01) | |
| *H04J 4/00* | (2006.01) | |
| *H04J 14/08* | (2006.01) | |
| *H04Q 11/00* | (2006.01) | |

(52) U.S. Cl.
CPC ............ *H04J 14/08* (2013.01); *H04Q 11/0005* (2013.01); *H04Q 2011/0064* (2013.01)

(58) Field of Classification Search
CPC ................ H04J 14/08; H04Q 11/0005; H04Q 2011/0064

USPC .................................................. 370/478, 485
See application file for complete search history.

(56) References Cited

U.S. PATENT DOCUMENTS

| | | | | |
|---|---|---|---|---|
| 7,580,630 | B2 * | 8/2009 | Kee et al. ........................ | 398/25 |
| 8,000,604 | B2 * | 8/2011 | Qian et al. ...................... | 398/89 |
| 8,526,818 | B2 * | 9/2013 | Kim et al. ....................... | 398/67 |
| 8,548,329 | B2 * | 10/2013 | Kim et al. ....................... | 398/68 |
| 8,787,761 | B2 * | 7/2014 | Kanonakis et al. ............. | 398/79 |
| 2008/0008202 | A1 * | 1/2008 | Terrell et al. ................... | 370/401 |
| 2008/0063397 | A1 * | 3/2008 | Hu et al. .......................... | 398/43 |
| 2008/0123620 | A1 * | 5/2008 | Ko et al. ......................... | 370/349 |
| 2008/0175265 | A1 * | 7/2008 | Yonge et al. .................... | 370/447 |
| 2009/0092394 | A1 * | 4/2009 | Wei et al. ........................ | 398/79 |

(Continued)

OTHER PUBLICATIONS

Wei et al; Demonstration of an optical OFDMA Metro ring network with dynamic sub-carrier allocation;2009; OSA//OFC/NFOEC.*

(Continued)

*Primary Examiner* — Ken Vanderpuye
*Assistant Examiner* — Amritbir Sandhu
(74) *Attorney, Agent, or Firm* — Nelson Mullins Riley & Scarborough LLP; Anthony A. Laurentano, Esq.; Lewis Lee, Esq.

(57) ABSTRACT

A converged passive optical network (CPON) and a data transmission method are disclosed. The CPON is a combination of a time division multiple access-passive optical network (TDMA-PON) and an orthogonal frequency division multiple access-passive optical network (OFDMA-PON) and is able to dynamically controlling a bandwidth for upstream signal transmission through allocation of multiple subcarriers to each single optical network unit (ONU).

14 Claims, 10 Drawing Sheets

(56) References Cited

U.S. PATENT DOCUMENTS

| | | |
|---|---|---|
| 2010/0054735 A1 | 3/2010 | Wei et al. |
| 2010/0158526 A1* | 6/2010 | Lee et al. ............ 398/75 |
| 2010/0215368 A1* | 8/2010 | Qian et al. ............ 398/67 |
| 2011/0135306 A1* | 6/2011 | Kim et al. ............ 398/68 |
| 2012/0230693 A1* | 9/2012 | Zou ............ 398/66 |
| 2013/0170375 A1* | 7/2013 | Kim et al. ............ 370/252 |
| 2013/0216229 A1* | 8/2013 | Cvijetic et al. ............ 398/66 |
| 2014/0133592 A1* | 5/2014 | Ko et al. ............ 375/261 |
| 2014/0199074 A1* | 7/2014 | Cho et al. ............ 398/79 |
| 2015/0055956 A1* | 2/2015 | Lee et al. ............ 398/79 |

OTHER PUBLICATIONS

Christodoulopoulos, K. et al., "Dynamic Bandwidth Allocation in Flexible OFDM-based Networks," Optical Fiber Communication Conference and Exposition and the National Fiber Optic Engineers Conference OFC/NFOEC, pp. 1-3 (2011).

Wei, Wei et al., "Demonstration of an Optical OFDMA Metro Ring Network with Dynamic Sub-carrier Allocation," Conference on Optical Fiber Communication, pp. 1-3 (2009).

* cited by examiner

CONVERGED PON FOR TDMA-PON SERVICE BASED ON OFDMA-PON

CROSS-REFERENCE TO RELATED APPLICATION

This application claims the priority benefit of Korean Patent Application No. 10-2011-0147649, filed on Dec. 30, 2011, in the Korean Intellectual Property Office, the disclosure of which is incorporated herein by reference.

BACKGROUND

1. Field of the Invention

The present invention relates to an optical network terminal for receiving a time division multiple access-passive optical network (TDMA-PON) service using an orthogonal frequency division multiple access (OFDMA)-PON technology, and more particularly, to a structure and a method of a converged PON (CPON) for dynamically providing an upstream transmission bandwidth through allocation of multiple subcarriers to each single optical network unit (ONU).

2. Description of the Related Art

Conventional flow-based Digital Subscriber Line (xDSL) and cable network technologies are unable to support high-quality Internet Protocol Television (IPTV) services and novel subscriber multimedia services requiring a wide transmission bandwidth, efficiently. In order to overcome such a drawback, Fiber To The Home (FTTH) technologies based on a fiber optic cable have been employed as access network technology. As a representative technology applied to the FTTH, a passive optical network (PON) includes an optical line terminal (OLT) installed at a service provider, an optical network unit/terminal (ONT/ONU) installed at a subscriber, and an optical distribution network (ODN) connecting the terminals.

The ODN used in the PON includes only a fiber optic cable and an unpowered passive element and thus, does not involve obstacles created by active elements. Moreover, a long-distance transmission function provided by the fiber optic cable further allows for a telephone company and a subscriber to be separated by a greater distance and thus, contributes to a decrease in the number of telephone companies. Accordingly, since the PON technology enables communications service providers to employ substantially fewer networks and telephone companies, maintenance costs are reduced considerably.

In a general network structure of the PON, an OLT is installed at a local telephone company or a service provider point-of-presence (POP) and a passive element having a 1-to-N distribution is disposed at a location on which subscribers converge, thereby connecting ONUs. Such PON technology is generally classified into a time division multiple access (TDMA)-PON enabling ONUs to transmit data to an OLT via time division multiplexing and a wavelength division multiplexing (WDM)-PON enabling transmission of data by allocating a unique wavelength to each ONU. Currently, only TDMA-PON technology is a standard recommendation and is divided, based on a transmission protocol, into gigabit-capable PON (GPON) of the Telecommunication Standardization Sector of the International Telecommunications Union (ITU-T) Full Service Access Network (FSAN), and an Ethernet PON (EPON) of the Institute of Electrical and Electronics Engineers (IEEE) 802.3.

The IEEE 802.3 completed the 1 Gbps-EPON standard in 2004 and then the 10 Gbps-EPON standard in 2009. The ITU-T (FSAN) completed the asymmetric 2.5 Gbps-GPON in 2005 and then the 10 Gbps-XG-PON1 standard in 2010. In addition, white papers on the NG-PON2 standard including strategies for evolution of future access networks were written, which mention not only next-generation high-capacity TDMA-PONs but also WDM-PON and OFDMA-PON standards. Currently, an EPON and a GPON that belong to TDMA-PON technology are generally applied to access networks. Further, in recent years, to extend transmission bandwidths of the EPON and the GPON, application of a 10 Gbps EPON and an XG-PON1 are being prepared while an existing installed ODN is still in use.

Recently, an OFDMA-PON is receiving attention in light of the ability to extend a transmission bandwidth through multiple subcarriers while adopting an ODN conventionally used in a TDMA-PON without structural change. That is, the OFDMA-PON may provide a broadband access through a combination of the multiple subcarriers and time division in the subcarriers and offer various TDMA-PON services by the subcarriers through the existing ODN.

However, in order to provide existing TDMA-PON services efficiently, through use of the OFDMA-PON, operating a plurality of subcarriers by individual services is recommended, in lieu of allocating a fixed subcarrier to each service. Further, a structure of receiving TDMA-PON services and having a predetermined delay time in an OFDMA-PON section is necessary.

SUMMARY

An aspect of the present invention provides a converged passive optical network (CPON) capable of providing different protocols of time division multiple access-passive optical network (TDMA-PON) services at the same time, using a single orthogonal frequency division multiple access-passive optical network (OFDMA-PON).

Another aspect of the present invention also provides a CPON efficiently and dynamically providing an upstream transmission bandwidth by downstream allocating an OFDM subcarrier by each service protocol and upstream allocating multiple subcarriers per ONT.

Still another aspect of the present invention provides a CPON enabling transmission of services through an OFDMA-PON without changing TDMA-PON equipment.

According to an aspect of the present invention, there is provided an optical line terminal (OLT) of a CPON that is a combination of a TDMA-PON and an OFDMA-PON, the OLT including: an OLT interface unit to be matched with an OLT of the TDMA-PON corresponding to each of a plurality of services of the TDMA-PON; a subcarrier queue transmission unit to process a subcarrier queue corresponding to each of the plurality of services; an OFDM frame processing unit to process an OFDM frame corresponding to each of the plurality of services; and an OFDM modem to transmit and receive the OFDM frame.

According to an aspect of the present invention, there is provided an ONT of a CPON that is a combination of a TDMA-PON and an OFDMA-PON, the ONT including: an OFDM modem to transmit and receive an OFDM frame to and from an OLT through an optical link; an OFDM frame processing unit to process an OFDM frame corresponding to each of a plurality of services; a subcarrier queue transmission unit to process a subcarrier queue corresponding to each of the plurality of services; and an ONT interface unit to be matched with an ONT of the TDMA-PON corresponding to each of the plurality of services.

According to an aspect of the present invention, there is provided a CPON that is a combination of a TDMA-PON and an OFDMA-PON, the CPON including an OLT and a plurality of ONTs, wherein the OLT downstream transmits data to the respective ONTs through independent subcarriers of the respective ONTs, and each of the plurality of ONTs upstream transmits data to the OLT through a shared subcarrier.

According to an aspect of the present invention, there is provided a method of downstream transmitting data performed by an OLT of a CPON that is a combination of a TDMA-PON and an OFDMA-PON, the method including: converting a data signal corresponding to each of a plurality of services of the TDMA-PON into a media access control (MAC) frame or a GPON transmission convergence (GTC) frame based on a transmission protocol; converting the MAC frame or the GTC frame into an OFDM frame by adding overhead information to the MAC frame or the GTC frame; and transmitting the OFDM frame to an ONT of the OFDMA-PON.

According to an aspect of the present invention, there is provided a method of upstream transmitting data performed by an ONT of a CPON that is a combination of a TDMA-PON and an OFDMA-PON, the method including: converting a data signal corresponding to each of a plurality of services received from an ONT of the TDMA-PON into an MAC frame or a GTC frame; converting the MAC frame or the GTC frame into an OFDM frame by adding overhead information to the MAC frame or the GTC frame; and transmitting the OFDM frame to an OLT of the OFDMA-PON using a dynamically allocated subcarrier.

According to an aspect of the present invention, there is provided a method of allocating a subcarrier performed by an OLT of a CPON that is a combination of a TDMA-PON and an OFDMA-PON, the method including: managing information on a subcarrier usable by an ONT of the OFDMA-PON by each of a plurality of services of the TDMA-PON; and dynamically allocating an idle subcarrier based on a status of a subcarrier queue of the ONT of the OFDMA-PON.

According to an aspect of the present invention, an OFDM frame transmitted between an OLT and an ONT of an OFDMA-PON in a CPON that is a combination of a TDMA-PON and an OFDMA-PON may include: overhead information including at least one of start delimiter information and end delimiter information about extraction of the OFDM frame, bit interleaved parity (BIP) information to measure a bit error rate (BER) of a downstream link, bitmap information about a subcarrier usable by an ONT by a plurality of services, a service type, and an ONT identification (ID); and data information about a plurality of services of the TDMA-PON.

As described above, an aspect of the present invention enables various protocols of TDMA-PON services to be received at the same time through a single OFDMA-PON.

Another aspect of the present invention allows enhancement in upstream transmission efficiency by dynamically allocating subcarriers based on upstream traffic using a method of allocating multiple subcarriers to each ONT.

Still another aspect of the present invention efficiently provides TDMA-PON services by adding an OLT and an ONT of an OFDMA-PON without changing TDMA-PON equipment.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
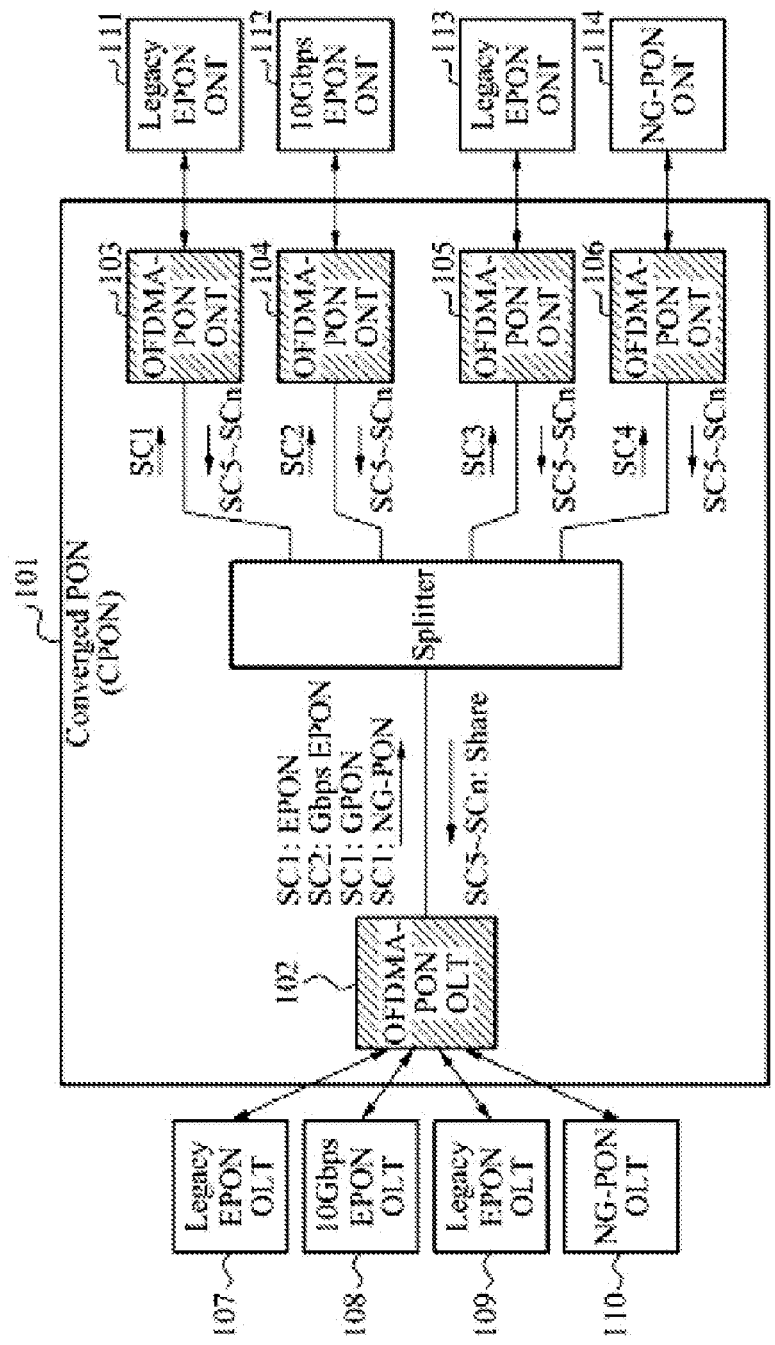
FIG. 1 illustrates a detailed structure of a converged passive optical network (CPON) according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures. In the present invention, an optical line terminal is abbreviated to OLT, and an optical network terminal is abbreviated to ONT.

FIG. 1 illustrates a structure of a converged passive optical network (CPON) according to an exemplary embodiment of the present invention.

Referring to FIG. 1, the CPON 101 includes an OLT 102 of an orthogonal frequency division multiple access (OFDMA)-PON and a plurality of ONTs 103 to 106 of the OFDMA-PON.

A CPON provides reception of various time division multiple access (TDMA)-PON services at the same time, using multiple subcarriers of the OFDMA-PON in an existing optical distribution network (ODN). Thus, the CPON 101 serves to match OLTs and ONTs of the TDMA-PON without structural modification.

The OLT 102 may be matched with a media access control (MAC) device included in each OLT 107 to 110 of the TDMA-PON and transmit the OFDMA subcarriers to the ONTs 103 to 106. The ODN includes a splitter as a link to connect the OLT 102 and the ONTs 103 to 106. The ONTs 103 to 106 may transmit the OFDMA subcarriers transmitted from the OLT 102 to MAC devices included in the ONTs 111 to 114 of the TDMA-PON.

The CPON 101 of the present invention has a structure in which the separate subcarriers are allocated downstream to the ONTs based on a transmission service protocol and all ONTs share the multiple subcarriers upstream. In particular, each ONT may dynamically use a transmission bandwidth through sharing of the multiple subcarriers and allocation of the subcarriers based on upstream traffic.

In FIG. 1, the OLT 102 may transmit a plurality of service protocols downstream to the ONTs 103 to 106 through the different OFDMA subcarriers, respectively. For example, the OLT 102 may transmit data about an EPON service downstream to the ONT 103 through a subcarrier 1 (SC 1) and transmit data about a 10 Gbps EPON service downstream to the ONT 104 through a subcarrier 2 (SC 2). Similarly, the OLT 102 may transmit data about a GPON service downstream to the ONT 105 through a subcarrier 3 (SC 3) and transmit data about an NG-PON service downstream to the ONT 106 through a subcarrier 4 (SC 4).

The ONTs 103 to 106 may share subcarriers in a 5 to n configuration to transmit data upstream to the OLT 102. Different numbers of shared subcarriers may be allocated to the respective ONTs 103 to 106 based on a subcarrier queue status.

In short, the CPON technology according to the present invention is a converged access method of simultaneously providing different TDMA-PON protocol services using a single OFDMA-PON.

Figure 2:
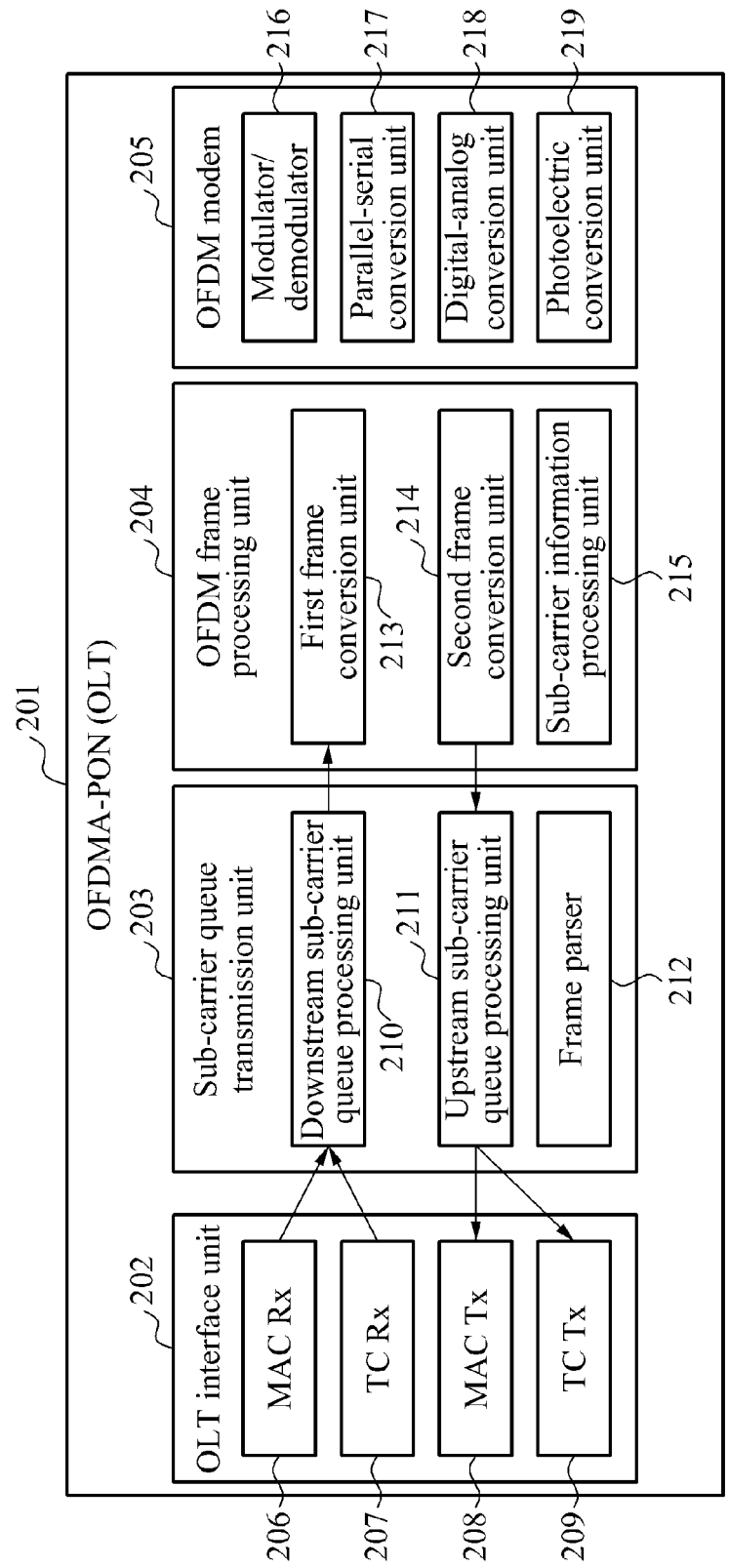
FIG. 2 illustrates an OLT of the CPON according to an exemplary embodiment of the present invention.

FIG. 2 illustrates an OLT of the CPON according to an exemplary embodiment of the present invention.

FIG. 2 shows a detailed configuration of the OLT of the OFDMA-PON shown in FIG. 1. The OLT 201 may include an OLT interface unit 202, a subcarrier queue transmission unit 203, an OFDM frame processing unit 204, and an OFDM modem 205.

The OLT interface unit 202 may be matched with the OLTs of the TDMA-PON corresponding to the TDMA-PON services, respectively. Here, the OLT interface unit 202 may receive a data signal from the OLTs of the TDMA-PON and convert the signal into a downstream data frame that is an MAC frame or a GPON transmission convergence (GTC) frame based on a transmission protocol. The OLT interface unit 202 may include an MAC reception unit 206 and an MAC transmission unit 208 which are associated with an EPON and a TC reception unit 207 and a TC transmission unit 209 which are associated with a GPON and an NG-PON.

The subcarrier queue transmission unit 203 may process a subcarrier queue corresponding to each of the services. The subcarrier queue transmission unit 203 may include a downstream subcarrier queue processing unit 210, an upstream subcarrier processing unit 211, and a frame parser 212. The downstream subcarrier queue processing unit 210 may transmit a downstream subcarrier queue corresponding to each of the services. The upstream subcarrier processing unit 211 may transmit an upstream subcarrier queue transmitted from an ONT of the OFDMA-PON. The frame parser 212 may determine an output port based on a service type of the upstream subcarrier queue.

The OFDM frame processing unit 204 may process an OFDM frame corresponding to each of the services. In detail, the OFDM frame processing unit 204 may include a first frame conversion unit 213 and a second frame conversion unit 214.

The first frame conversion unit 213 may convert a downstream data frame corresponding to each of the services into an OFDM frame. For example, the first frame conversion unit 213 may convert the downstream data frame into the OFDM frame by adding overhead information to the downstream data frame, the overhead information including at least one of start delimiter information and end delimiter information about extraction of the OFDM frame, bit interleaved parity (BIP) information to measure a bit error rate (BER) of a downstream link, bitmap information about a subcarrier usable by an ONT according to the respective services, a service type, and an ONT identification (ID).

The second frame conversion unit 214 may convert an OFDM frame transmitted from an ONT of the OFDMA-PON into an upstream data frame corresponding to each of the services. As an example, the second frame conversion unit 214 may convert the OFDM frame into the upstream data frame by eliminating overhead information from the OFDM frame, the overhead information including at least one of start delimiter information and end delimiter information about extraction of the OFDM frame, BIP information to measure a BER of a downstream link, bitmap information about a subcarrier usable by an ONT, according to a service, a service type, and an ONT ID.

In addition, the OFDM frame processing unit 204 may further include a subcarrier information processing unit 215 to map subcarrier information about an upper data frame by the ONTs of the OFDMA-PON according to the service.

The OFDM modem 205 may transmit and receive an OFDM frame. The OFDM modem 205 may include a modulator/demodulator 216, a parallel-serial conversion unit 217, a digital-analog conversion unit 218, and a photoelectric conversion unit 219.

The modulator/demodulator 216 may modulate or demodulate an OFDM. The parallel-serial conversion unit 217 may convert a signal between a parallel signal and a serial signal. Further, the digital-analog conversion unit 218 may convert a signal between a digital signal and an analog signal. The photoelectric conversion unit 219 may convert a signal between an electrical signal and an optical signal.

Figure 3:
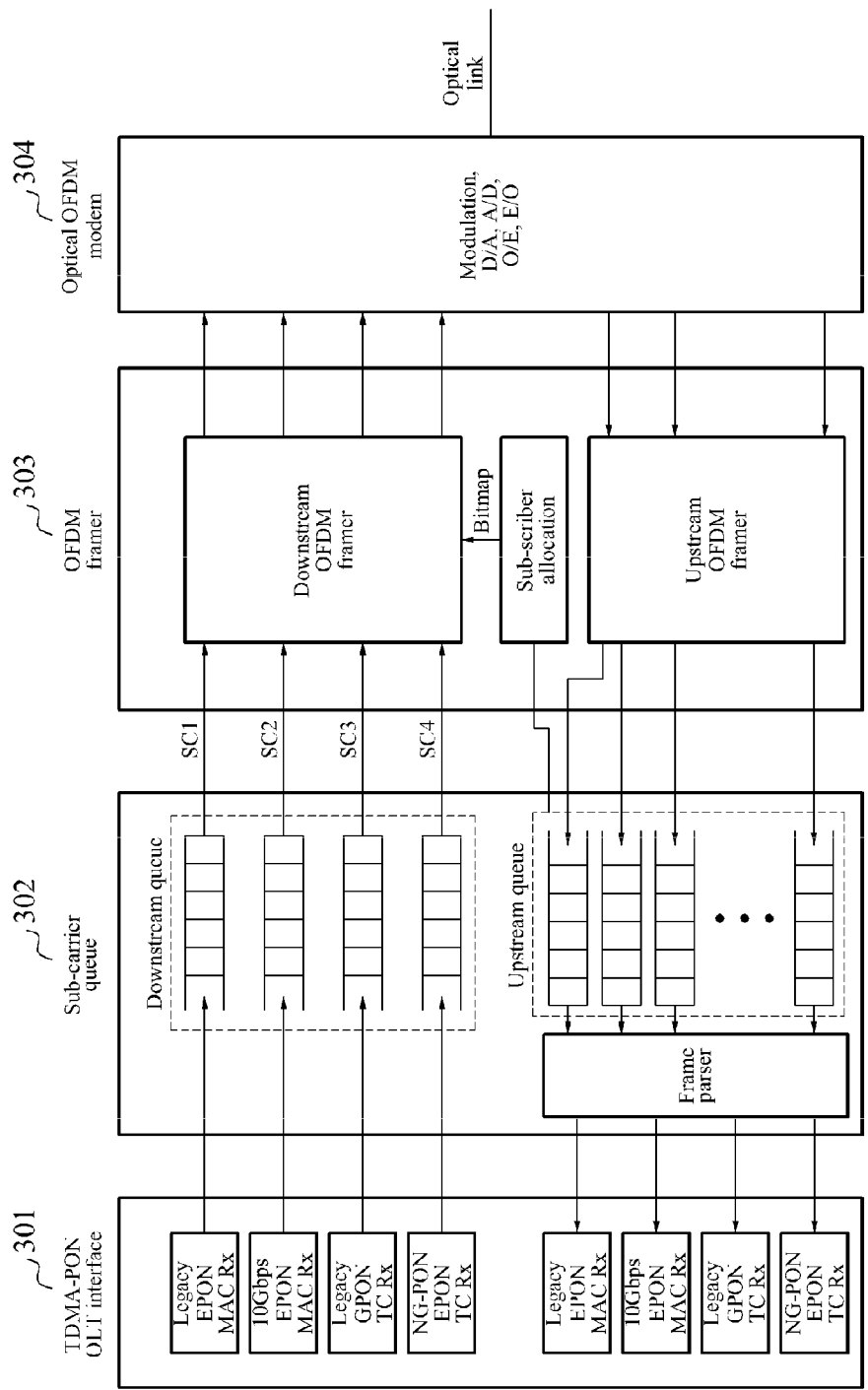
FIG. 3 illustrates a detailed operation of the OLT of the CPON according to an exemplary embodiment of the present invention.

FIG. 3 illustrates a detailed operation of an OLT of the CPON according to an exemplary embodiment of the present invention.

A TDMA-PON OLT interface 301 of FIG. 3 corresponds to the OLT interface unit 202, and a subcarrier queue 302 corresponds to the subcarrier queue transmission unit 203 of FIG. 2. Further, an OFDM framer 303 of FIG. 3 corresponds to the OFDM frame processing unit 204 of FIG. 2, and an optical OFDM modem 304 of FIG. 3 corresponds to the OFDM modem 205 of FIG. 2.

The TDMA-PON OLT interface 301 serves as an interface for matching TDMA-PON OLT equipment. The TDMA-PON OLT interface 301 includes an EPON MAC device for transmission of an EPON service and a transmission convergence (TC) device for transmission of a GPON service.

A legacy EPON MAC and a 10 Gbps EPON MAC may convert signals transmitted from a 1 Gbps EPON OLT and a 10 Gbps EPON OLT back into Ethernet frames, that is, MAC frames. A legacy GPON TC and an NG-PON TC may convert signals transmitted from a 2.5 Gbps GPON OLT and a 10 Gbps GPON OLT back into 125-us GPON TC frames.

The subcarrier queue 302 includes a downstream subcarrier queue, an upstream subcarrier queue, and a frame parser to determine an output port for transmitting an upstream data signal. The downstream subcarrier queue corresponds to the downstream subcarrier queue processing unit 210 of FIG. 2, the upstream subcarrier queue corresponds to the upstream subcarrier queue processing unit 211 of FIG. 2, and the frame parser corresponds to the frame parser 212 of FIG. 2.

The downstream subcarrier queue is used by TDMA-PON services. Further, the downstream subcarrier queue may include a single queue or multiple queues by each service. The upstream subcarrier queue may use subcarriers respectively allocated to OFDMA-PON ONTs based on bitmap information about the subcarriers allocated to the respective ONTs transmitted from the OFDMA-PON ONTs. The frame parser determines an output port corresponding to the OLTs of the TDMA-PON based on a service type included in an upstream OFDM frame. The service type is added in the OFDMA-PON ONTs.

The OFDM framer 303 includes a downstream OFDM framer, an upstream OFDM framer, and an upstream subcarrier allocation. The downstream OFDM framer corresponds to the first frame conversion unit 213 of FIG. 2, the upstream OFDM framer corresponds to the second frame conversion unit 214 of FIG. 2, and the upstream subcarrier allocation corresponds to the subcarrier information processing unit 215 of FIG. 2.

The downstream OFDM framer converts a downstream data frame input by each TDAM-PON service into an OFDM frame by adding start information, that is a start delimiter, and end information, that is, an end delimiter, on an OFDM signal, a service type, and information about an upstream subcarrier used by each ONT to overhead information region of the downstream data frame and transmits the OFDM frame. Here, the upstream subcarrier information is mapped onto a bitmap by each service and transmitted. The upstream OFDM framer may eliminate overhead information from the OFDM frame transmitted from each OFDMA-PON ONT to convert the OFDM frame into the data frame.

The optical OFDM modem 304 may serve to modulate an OFDM signal, convert a parallel signal to a serial signal, convert a digital signal to an analog signal, convert an electrical signal to an optical signal, and perform transpose operations of each conversion. The OFDMA-PON OLT of the CPON according to the present invention transmits an OFDM signal to the OFDMA-PON ONTs at a period of 125 microseconds (µs).

Figure 4:
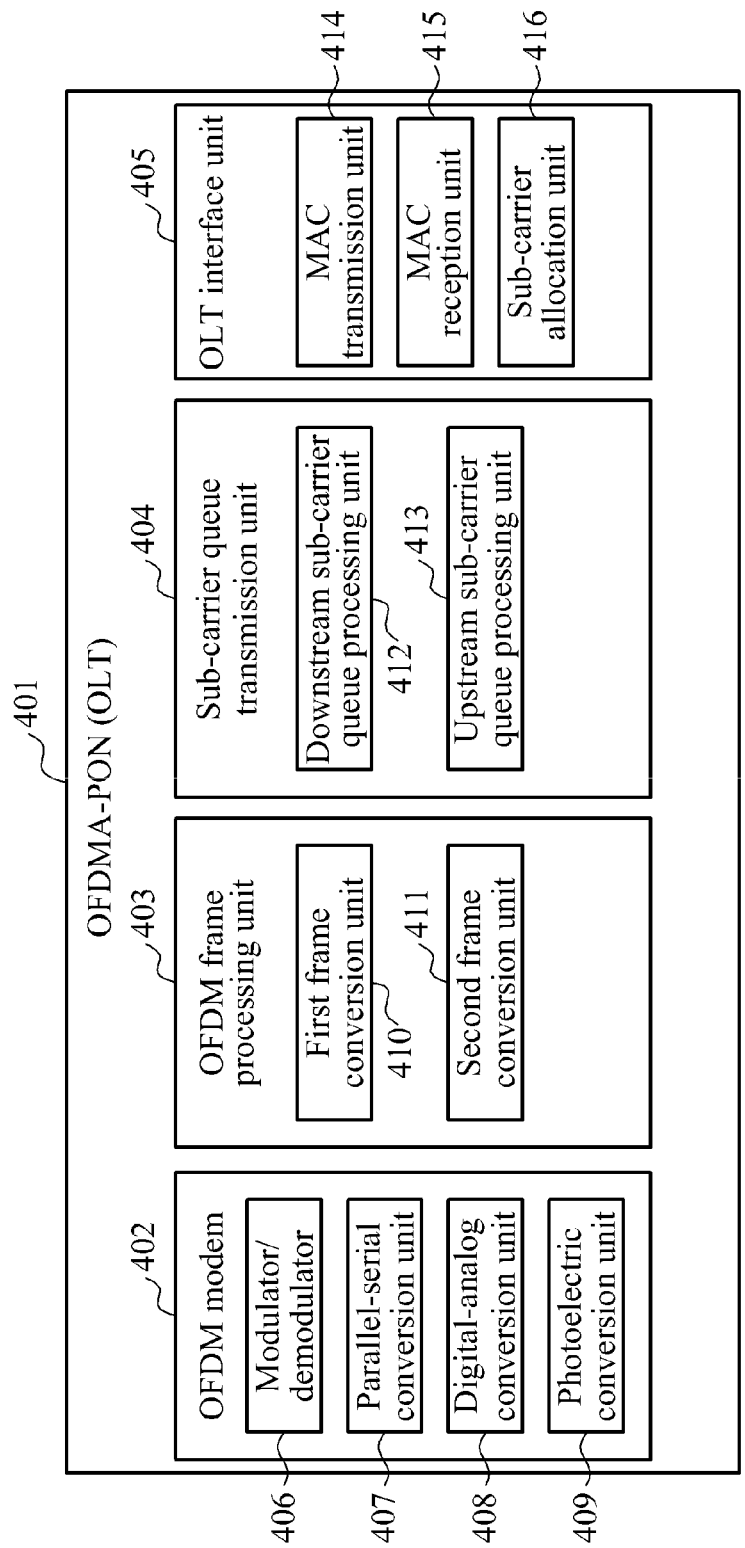
FIG. 4 illustrates an ONT of the CPON according to an exemplary embodiment of the present invention.

FIG. 4 illustrates an ONT of the CPON according to an exemplary embodiment of the present invention.

Referring to FIG. 4, the ONT 401 of an OFDMA-PON corresponds to any one of the ONTs 103 to 106 of FIG. 1. The ONT 401 includes an OFDM modem 402, an OFDM frame processing unit 403, a subcarrier queue transmission unit 404, and an ONT interface unit 405.

The OFDM modem 402 transmits and receives an OFDM frame to and from an OLT through an optical link. In FIG. 4, the OFDM modem 402 includes a modulator/demodulator 406, a parallel-serial conversion unit 407, a digital-analog conversion unit 408, and a photoelectric conversion unit 409.

The modulator/demodulator 406 modulates or demodulates an OFDM frame, and the parallel-serial conversion unit 407 converts a signal between a parallel signal and a serial signal. The digital-analog conversion unit 408 converts a signal between a digital signal and an analog signal, and the photoelectric conversion unit 409 converts a signal between an electrical signal and an optical signal.

The OFDM frame processing unit 403 processes OFDM frames corresponding to a respective plurality of services. The OFDM frame processing unit 403 may include a first frame conversion unit 410 and a second frame conversion unit 411.

The first frame conversion unit 410 may convert an OFDM frame transmitted downstream through a subcarrier into a data frame on a TDMA-PON service. For example, the first frame conversion unit 410 may convert the OFDM frame into the data frame by eliminating overhead information from the OFDM frame. The second frame conversion unit 411 may convert a data frame on a TDMA-PON service into an OFDM frame for upstream transmission. For example, the second frame conversion unit 411 may convert the data frame into the OFDM frame by adding overhead information to the data frame.

Here, the overhead information may include at least one of start delimiter information and end delimiter information about extraction of the OFDM frame, BIP information to measure a BER of a downstream link, bitmap information about a subcarrier usable by an ONT according to the respective services, a service type, and an ONT ID.

The subcarrier queue transmission unit 404 processes subcarrier queues corresponding to the respective plurality of services. The subcarrier queue transmission unit 404 includes a downstream subcarrier queue processing unit 412 and an upstream subcarrier queue processing unit 413.

The downstream subcarrier queue processing unit 412 transmits a downstream subcarrier queue associated with a TDMA-PON service to a MAC transmission unit of a TDMA-PON. The upstream subcarrier queue processing unit 413 receives an upstream subcarrier queue associated with a TDMA-PON service from a MAC reception unit of the TDMA-PON.

The ONT interface unit 405 is matched with ONTs of the TDMA-PON corresponding to the respective plurality of services. The ONT interface unit 405 includes an MAC transmission unit 414, an MAC reception unit 415, and a subcarrier allocation unit 416.

The MAC transmission unit 414 may transmit a downstream subcarrier queue to a matched ONT of the TDMA-PON. The MAC reception unit 415 may receive an upstream subcarrier queue from a matched ONT of the TDMA-PON. The subcarrier allocation unit 416 may select a subcarrier based on information about a subcarrier allocated by the OLT of the OFDMA-PON and a status of an upstream subcarrier queue of an ONT.

Figure 5:
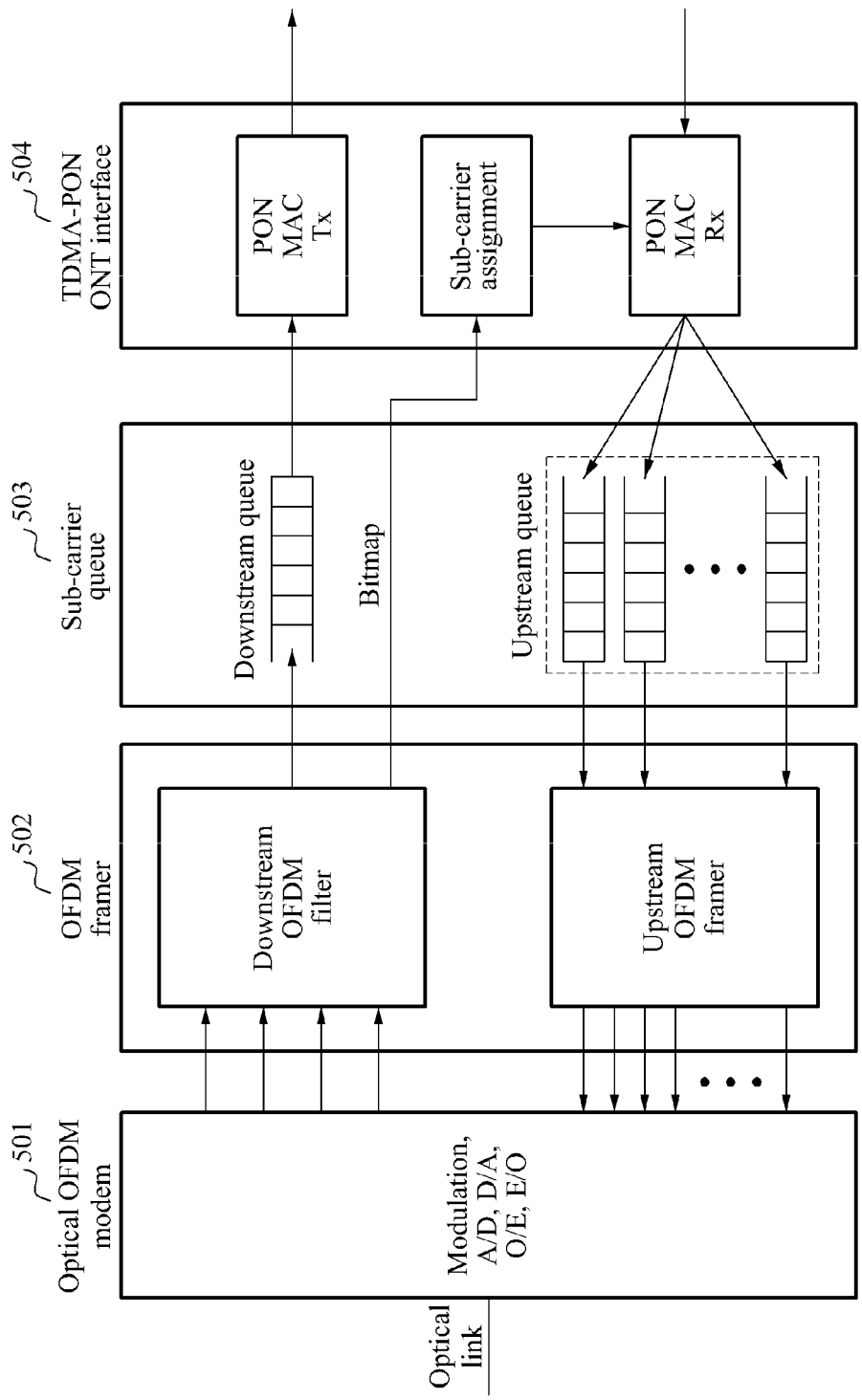
FIG. 5 illustrates a detailed operation of the ONT of the CPON according to an exemplary embodiment of the present invention.

FIG. 5 illustrates a detailed operation of an ONT of the CPON according to an exemplary embodiment of the present invention.

An optical OFDM modem 501 of FIG. 5 corresponds to the OFDM modem of FIG. 4, and an OFDM framer 502 of FIG. 5 corresponds to the OFDM frame processing unit 403 of FIG. 4. Further, a subcarrier queue 503 of FIG. 5 corresponds to the subcarrier queue transmission unit 404 of FIG. 4, and a TDMA-PON ONT interface 504 of FIG. 5 corresponds to the ONT interface 405 of FIG. 4.

The optical OFDM modem 501 may serve to modulate an OFDM signal, convert a parallel signal to a serial signal, convert a digital signal to an analog signal, convert an electrical signal to an optical signal, and perform transpose operations of the conversions.

The OFDM framer 502 largely includes a downstream OFDM filter and an upstream OFDM framer. The downstream OFDM filter corresponds to the first frame conversion unit 410 of FIG. 4, and the upstream OFDM framer corresponds to the second frame conversion unit 411 of FIG. 4.

The downstream OFDM filter selects only a subcarrier signal corresponding to the downstream OFDM filter from among multiple downstream subcarriers and eliminates overhead information included in an OFDM frame. Here, the downstream OFDM filter transmits subcarrier allocation bitmap information included in the overhead information to a subcarrier assignment of the TDMA-PON ONT interface 504. Further, the downstream OFDM filter blocks an OFDM frame which fails to correspond to the service protocol of the downstream OFDM filter.

The upstream OFDM framer transmits a data frame via adding overhead information to the data frame in order to convert multiple subcarrier signals into OFDM frames. Here, the added overhead information may include at least one of start delimiter information and end delimiter information about extraction of an OFDM frame, BIP information to measure a BER of a downstream link, bitmap information about a subcarrier usable by an ONT according to the respective services, a service type, and an ONT ID. However, the bitmap information about the subcarrier provides bitmap information about a subcarrier currently being used by the ONT among allocated subcarriers and subcarrier request information.

The subcarrier queue 503 includes a single downstream subcarrier queue and multiple upstream subcarrier queues. The downstream subcarrier queue corresponds to the downstream subcarrier queue processing unit 412 of FIG. 4, and the upstream subcarrier queues correspond to the upstream subcarrier queue processing unit 413 of FIG. 4.

The downstream subcarrier queue transmits an extracted data signal to a TDMA-PON MAC Tx of the TDMA-PON ONT interface 504. Conversely, the upstream subcarrier queues store data signals transmitted from a TDMA-PON MAC Rx of the TDMA-PON ONT interface 504, and then transmits the data signals to the OFDM framer 502.

The TDMA-PON ONT interface 504 includes the PON MAC Tx, the PON MAC Rx, and the subcarrier assignment. Here, the PON MAC Tx corresponds to the MAC transmission unit 414 of FIG. 4, the PON MAC Rx corresponds to the MAC reception unit 415 of FIG. 4, and the subcarrier assignment corresponds to the subcarrier allocation unit 416 of FIG. 4.

The PON MAC Tx and the PON MAC Rx provide matching with the TDMA-PON ONT. The subcarrier assignment selects a subcarrier used for upstream transmission based on bitmap information about multiple subcarriers allocated by the OFDMA-PON OLT and a status of an upstream subcarrier queue in the OFDMA-PON ONT.

Figure 6:
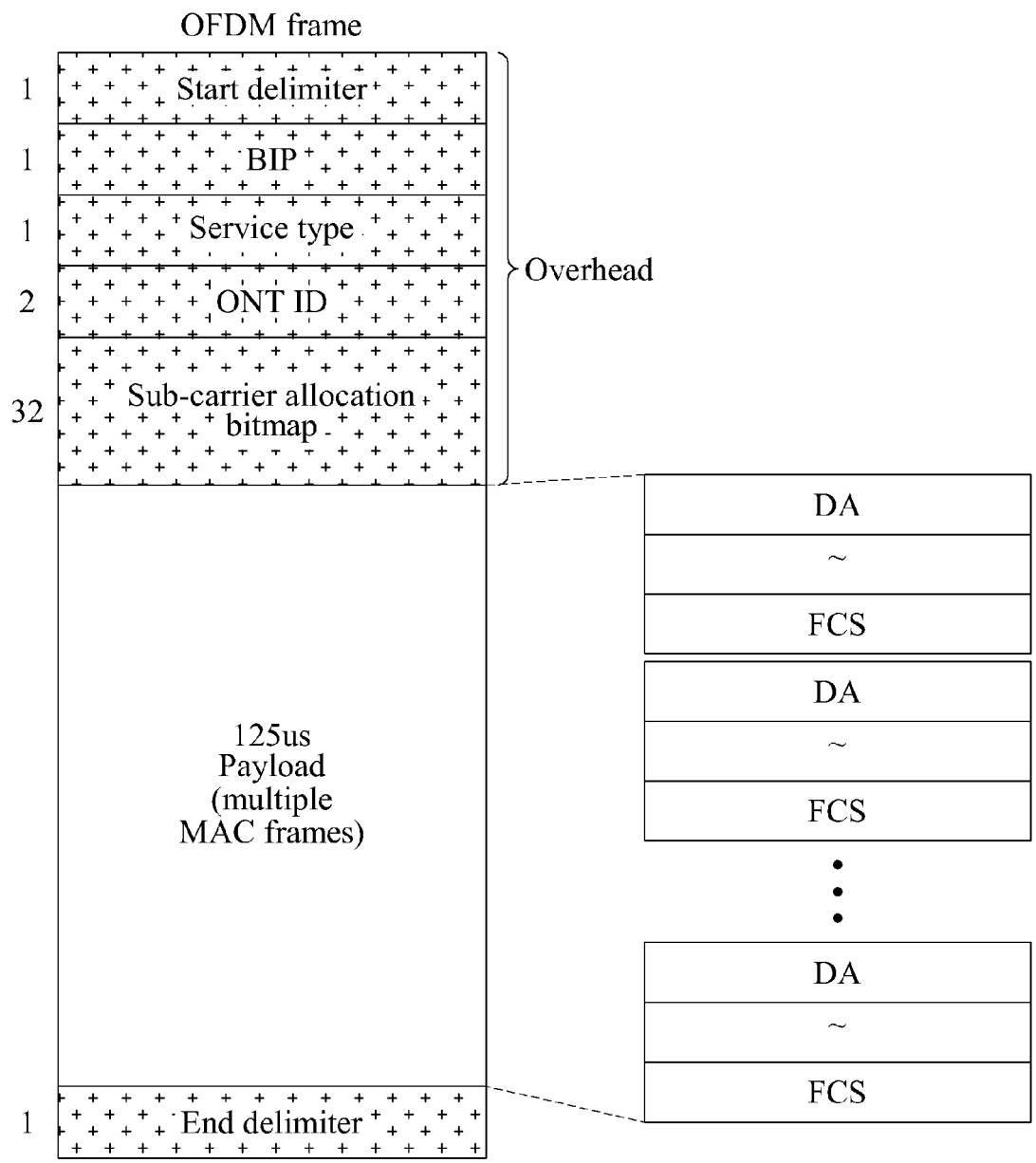
FIG. 6 illustrates a process of converting an MAC frame into an OFDM frame according to an exemplary embodiment of the present invention.

FIG. 6 illustrates a process of converting an MAC frame into an OFDM frame according to an exemplary embodiment of the present invention.

In FIG. 1, Ethernet frames, that is, MAC frames, corresponding to the EPON service are transmitted through a payload at a 125 μs period. Here, an OFDM frame is generated by adding 38-byte overhead information to the MAC frames.

The overhead information includes start delimiter information and end delimiter information for extraction of the OFDM frame. Further, the overhead information includes BIP information to measure a BER of a downstream CPON link and bitmap information about an upstream subcarrier used by each ONT according to each service protocol. The bitmap information presents information about use of all 256 subcarriers.

As shown in FIG. 6, the payload of the OFDM frame includes a plurality of Ethernet frames, that is, a plurality of MAC frames which are transmitted from a destination address (DA) to a frame check sequence (FCS) field. Then, a preamble and a starting frame delimiter (SFD) are added to the Ethernet frames in the payload by the OFDMA-PON ONT.

The BIP field includes a calculated bit value with respect to a payload of a previous OFDM frame. The service type field is used to identify which service a frame transmitted in the payload corresponds to. That is, the service type field is used for the OFDMA-PON ONT to identify whether the plurality of Ethernet frames included in the OFDM frame are for a legacy EPON, a 10 Gbps EPON, a legacy GPON, or an NG-PON. Thus, information about a subcarrier to be used by each OFDMA-PON ONT is obtained using the service type field and the subcarrier allocation bitmap.

Figure 7:
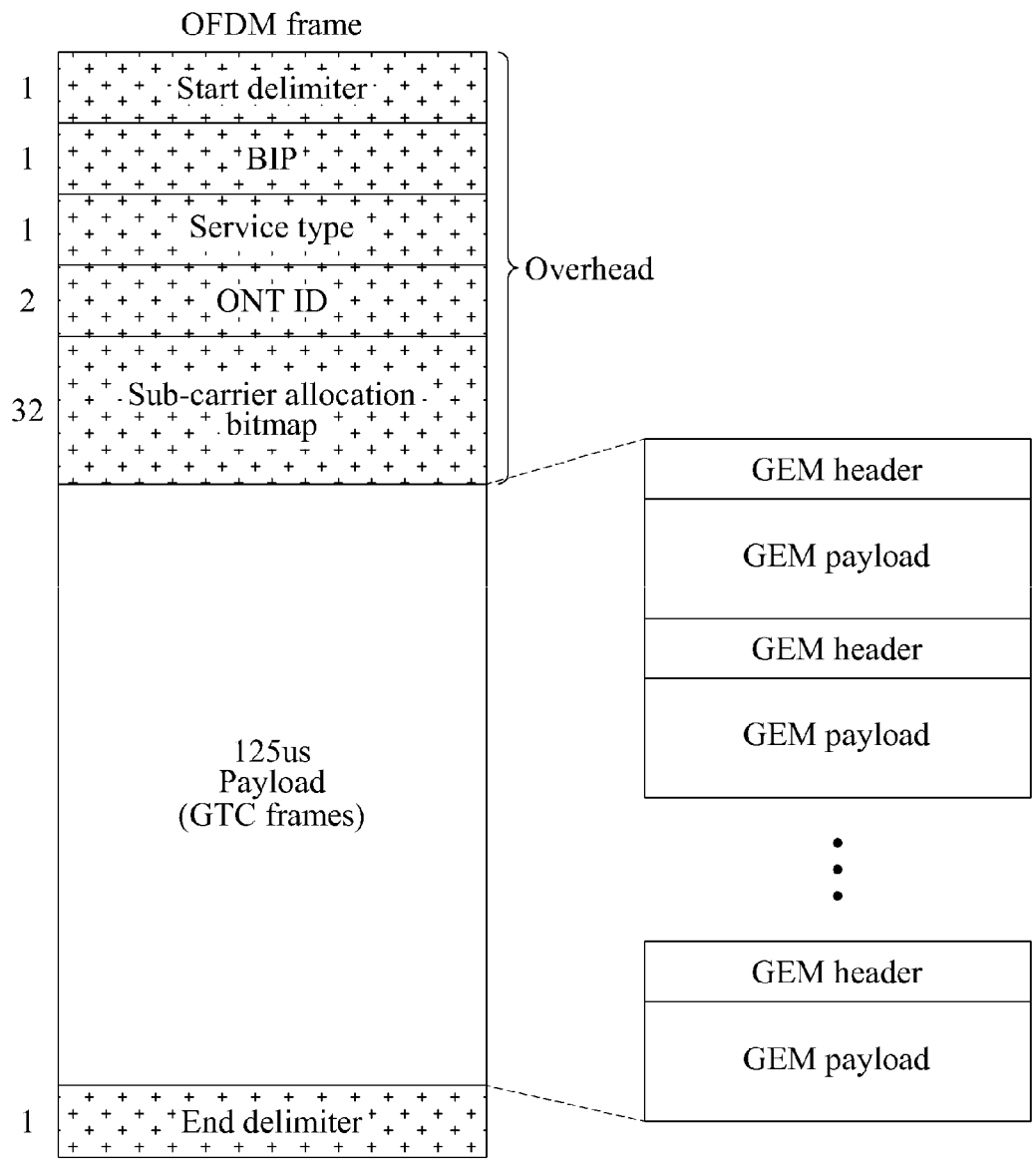
FIG. 7 illustrates a process of converting a GTC frame into an OFDM frame according to an exemplary embodiment of the present invention.

FIG. 7 illustrates a process of converting a GTC frame into an OFDM frame according to an exemplary embodiment of the present invention.

As shown in FIG. 7, an OFDM frame is generated to transmit GTC frames. That is, GTC frames are included in a payload of the OFDM frame, and 38-byte overhead information is further included in the OFDM frame. The overhead information of FIG. 7 is the same as the overhead information illustrated in FIG. 6.

The GTC frames are frames at a 125 μs period and include a plurality of GPON encapsulation method (GEM) frames. The GEM frames include GEM headers and GEM payloads. A size of the GTC frames transmitted through the payload of the OFDM frame is determined based on a transmission speed. That is, when a high clock frequency is used, a large amount of data is transmitted through the payload.

Figure 8:
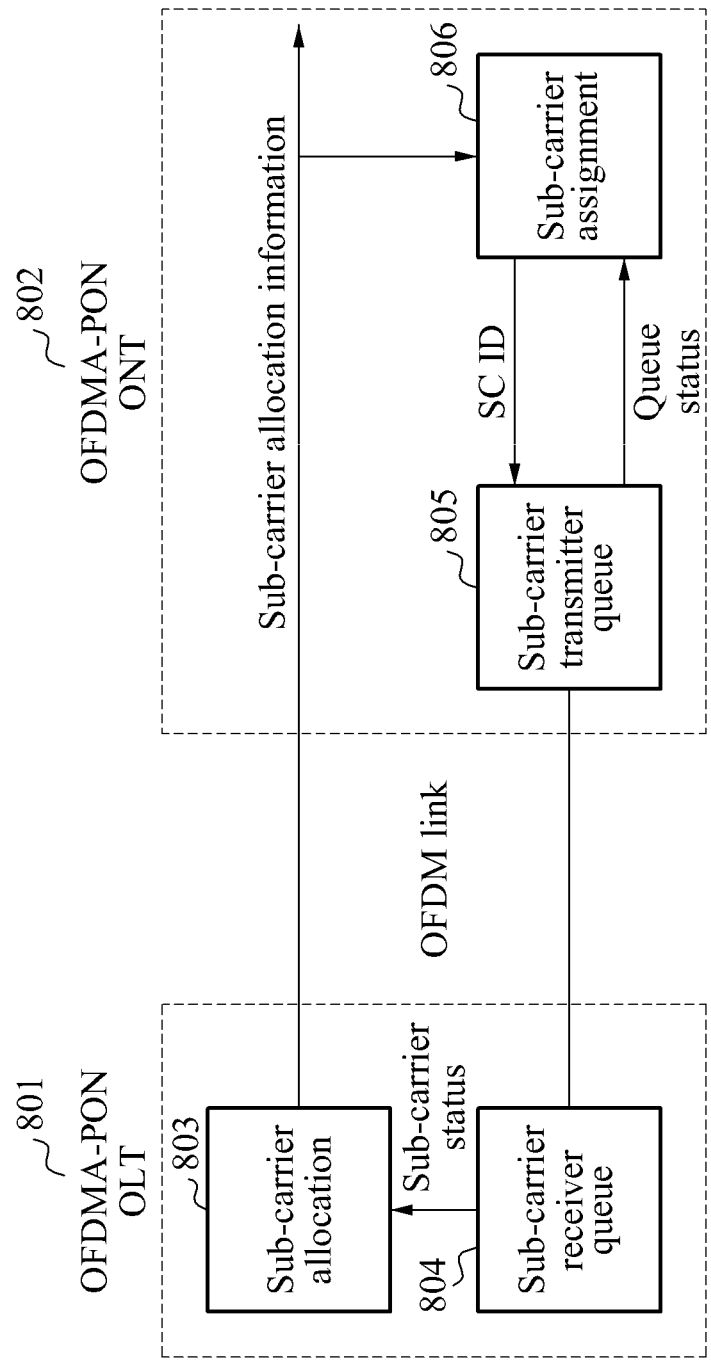
FIG. 8 illustrates a process of allocating a subcarrier according to an exemplary embodiment of the present invention.

FIG. 8 illustrates a process of allocating a subcarrier according to an exemplary embodiment of the present invention.

As shown in FIG. 8, a subcarrier allocation block 803 of an OFDMA-PON OLT 801 manages information about a subcarrier usable by each ONT with respect to each service protocol as a table. That is, the subcarrier allocation block 803 manages subcarrier information by each ONT currently using a legacy EPON service, subcarrier information by each ONT using a 10 Gbps EPON service, subcarrier information by each ONT using a legacy GPON service, and subcarrier information by each ONT using an NG-PON service as a table.

An OFDM frame is input through a subcarrier queue. Here, when an OFDM frame is not input to a subcarrier reception queue of the OFDMA-PON OLT 801 for a predetermined time, the subcarrier allocation 803 manages a relevant subcarrier as an idle subcarrier. When an OFDM frame is input, the subcarrier allocation block 803 manages a relevant subcarrier as a subcarrier in use.

When a critical buffer value of a subcarrier reception queue of each OFDMA-PON ONT 802 is 70% or higher, the subcarrier allocation block 803 presents a subcarrier currently not used as a bitmap in a header of a downstream OFDMA frame and allocates the subcarrier. Then, an upstream traffic amount of the OFDMA-PON ONTs 802 is determined through dynamic bandwidth allocation (DBA) of a TDMA-PON. Thus, the subcarrier allocation block 803 dynamically allocates a subcarrier based on the upstream traffic amount of the OFDMA-PON ONTs 802. That is, the subcarrier allocation block 803 sets and collects subcarriers not used for a predetermined time as idle subcarriers and allocates the subcarriers to the OFDMA-PON ONTs 802.

The subcarrier assignment block 806 selects allocated subcarriers based on an amount of traffic input from the ONT 802 and buffer occupancy of a subcarrier transmission queue in the OFDMA-PON ONT 802 using bitmap information about the subcarriers allocated by the OFDMA-PON OLT 801 and transmits an OFDM frame to the OLT 801. Thus, a number of allocated subcarriers sequentially increases or decreases individually based on the amount of traffic. Here, the ONT 802 transmits a subcarrier identification (SC ID) to be used as a subcarrier transmission queue to the OLT 801.

Figure 9:
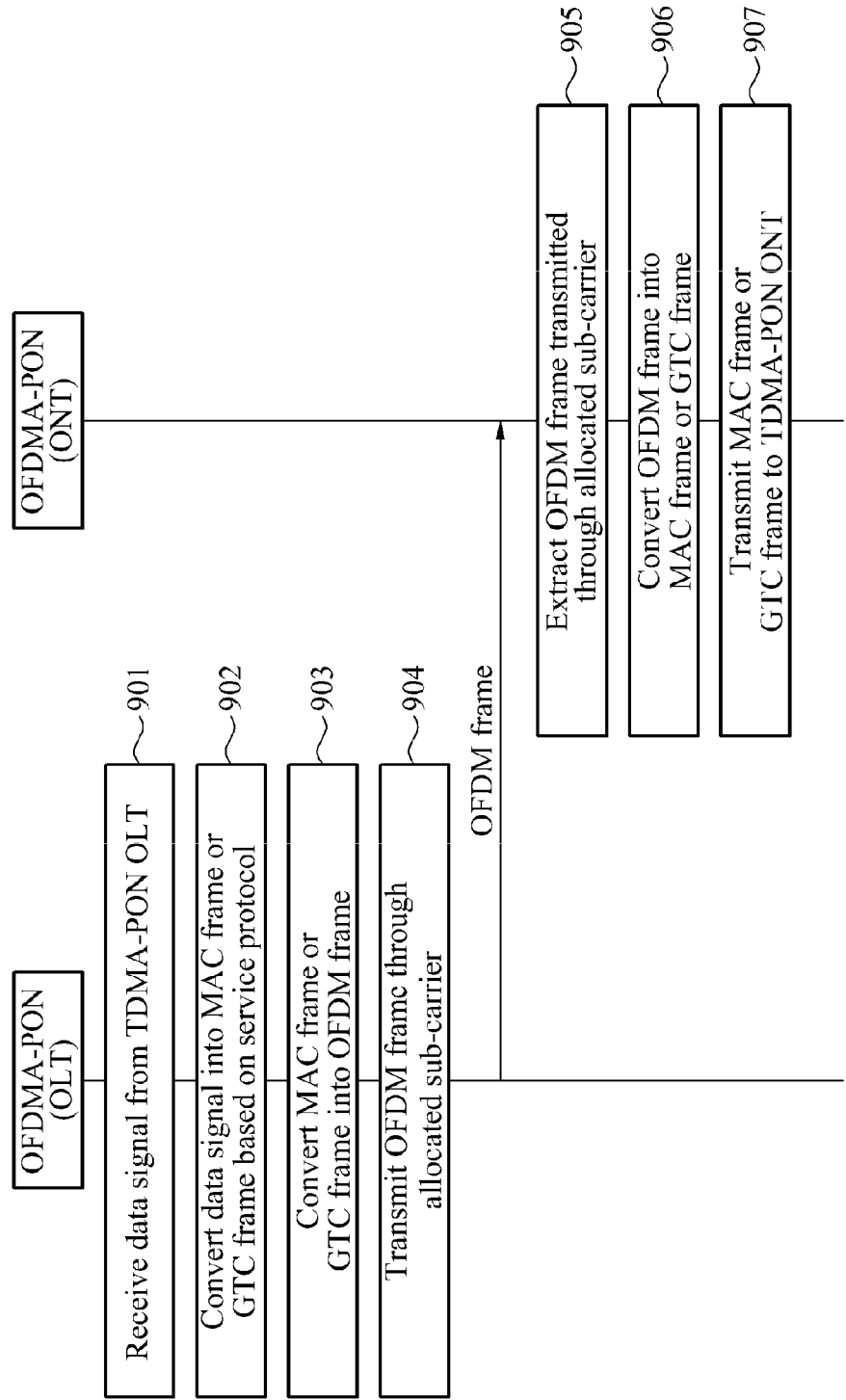
FIG. 9 is a flowchart illustrating a method of transmitting data downstream according to an exemplary embodiment of the present invention.

FIG. 9 is a flowchart illustrating a method of downstream transmitting data according to an exemplary embodiment of the present invention.

FIG. 9 illustrates a process of transmitting data downstream from an OLT of an OFDMA-PON to an ONT of the OFDMA-PON. Here, the OLT may downstream transmit data through independent subcarriers of a plurality of ONTs.

In operation 901, the OLT of the OFDMA-PON receives a data signal from an OLT of a TDAM-PON. In operation 902, the OLT may convert the data signal into an MAC frame or a GTC frame based on a transmission protocol. In operation 903, the OLT converts the MAC frame or the GTC frame into an OFDM frame by adding overhead information to the MAC frame or the GTC frame. In operation 904, the OLT may transmit the OFDM frame through an allocated subcarrier.

The transmitted OFDM frame arrives at the ONT through an ODN. In operation 905, the ONT extracts the OFDM frame transmitted through the subcarrier. Subsequently, in operation 906, the ONT converts the OFDM frame into the MAC frame or the GTC frame by eliminating the overhead information included in the OFDM frame. In operation 907, the ONT may transmit the MAC frame or the GTC frame to an ONT of the TDMA-PON.

Figure 10:
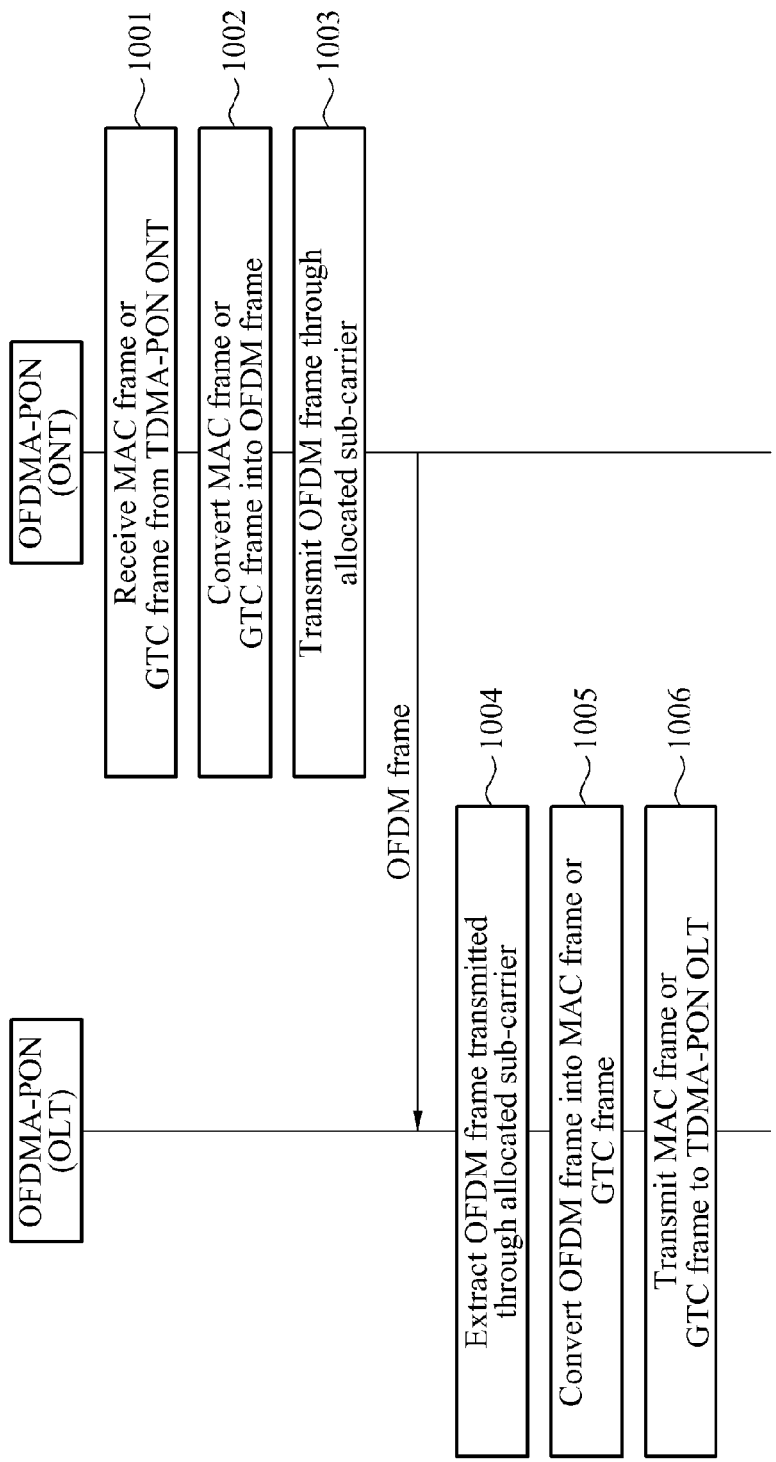
FIG. 10 is a flowchart illustrating a method of upstream transmitting data according to an exemplary embodiment of the present invention.

FIG. 10 is a flowchart illustrating a method of upstream transmitting data according to an exemplary embodiment of the present invention.

FIG. 10 illustrates a process of upstream transmitting data from an ONT of an OFDMA-PON to an OLT of the OFDAM-PON. Here, a plurality of ONTs may be dynamically allocated with a shared subcarrier and upstream transmit data to the OLT.

In operation 1001, the ONT of the OFDMA-PON receives an MAC frame or a GTC frame from an ONT of a TDMA-PON. In operation 1002, the ONT converts the MAC frame or the GTC frame into an OFDM frame.

In operation 1003, the ONT transmits the OFDM frame through an allocated subcarrier. Here, the subcarrier allocated to the ONT may be dynamically allocated based on a traffic status of a subcarrier used by the ONT.

In operation 1004, the OLT of the OFDMA-PON extracts the OFDM frame from the subcarrier transmitted through an ODN. In operation 1005, the OLT converts the OFDM frame into the MAC frame or GTC frame by eliminating overhead information from the OFDM frame. Subsequently, in operation 1006, the OLT transmits the MAC frame or the GTC frame to an OLT of the TDMA-PON.

A converged passive optical network (CPON) that is a combination of a time division multiple access-passive optical network (TDMA-PON) and an orthogonal frequency division multiple access-passive optical network (OFDMA-PON). The CPON comprising an optical line terminal (OLT) and a plurality of optical network terminals (ONTs). The OLT downstream transmits data to the respective ONTs through independent subcarriers of the respective ONTs, and each of the plurality of ONTs upstream transmits data to the OLT through a shared subcarrier.

The ONT converts a data signal corresponding to each of a plurality of services received from an ONT of the TDMA-PON into a media access control (MAC) frame or a GPON transmission convergence (GTC) frame. The ONT converts the MAC frame or the GTC frame into an OFDM frame by adding overhead information to the MAC frame or the GTC frame. And The ONT transmits the OFDM frame to an optical line terminal (OLT) of the OFDMA-PON using a dynamically allocated subcarrier.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An optical line terminal (OLT) of a converged passive optical network (CPON) that is a combination of a time division multiple access-passive optical network (TDMA-PON) and an orthogonal frequency division multiple access-passive optical network (OFDMA-PON), the OLT comprising:
   an OLT interface unit to be matched with an OLT of the TDMA-PON corresponding to each of a plurality of services of the TDMA-PON;
   a subcarrier queue transmission unit to process a subcarrier queue corresponding to each of the plurality of services;
   an OFDM frame processing unit to process an OFDM frame corresponding to each of the plurality of services; and
   an OFDM modem to transmit and receive the OFDM frame,
   wherein the OFDM frame processing unit comprises:
   a first frame conversion unit to convert an OFDM downstream frame transmitted through a subcarrier into a data frame associated with a service of the TDMA-PON; and
   a second frame conversion unit to convert a data frame associated with a service of the TDMA-PON into an OFDM frame for upstream transmission.

2. The OLT of claim 1, wherein the subcarrier queue transmission unit further comprises:
   a frame parser to determine an output port based on a service type of the upstream subcarrier queue.

3. The OLT of claim 1, wherein the OFDM frame processing unit comprises:
   a first frame conversion unit to convert a downstream data frame corresponding to each of the plurality of services into an OFDM frame; and
   a second frame conversion unit to convert an OFDM frame transmitted from an ONT of the OFDMA-PON into an upstream data frame corresponding to each of the plurality of services.

4. The OLT of claim 3, wherein the OFDM frame processing unit further comprises a subcarrier information processing unit to map subcarrier information of an upstream data frame by each ONT of the OFDMA-PON according to each of the plurality of services.

5. The OLT of claim 1, wherein the OFDM modem comprises:
   a modulator/demodulator to modulate or demodulate the OFDM frame;
   a parallel-serial conversion unit to convert a signal between a parallel signal and a serial signal;
   a digital-analog conversion unit to convert a signal between a digital signal and an analog signal; and
   a photoelectric conversion unit to convert a signal between an electrical signal and an optical signal.

6. The OLT of claim 3, wherein the first frame conversion unit converts the downstream data frame into the OFDM frame by adding overhead information to the downstream data frame, the overhead information comprising at least one of start delimiter information and end delimiter information about extraction of the OFDM frame, bit interleaved parity (BIP) information to measure a bit error rate (BER) of a downstream link, bitmap information about a subcarrier usable by an ONT according to the plurality of services, a service type, and an ONT identification (ID).

7. The OLT of claim 3, wherein the second frame conversion unit converts the OFDM frame into the upstream data frame by eliminating overhead information from the OFDM frame, the overhead information comprising at least one of start delimiter information and end delimiter information about extraction of the OFDM frame, bit interleaved parity (BIP) information to measure a bit error rate (BER) of a downstream link, bitmap information about a subcarrier usable by an ONT according to the plurality of services, a service type, and an ONT identification (ID).

8. The OLT of claim 1, wherein the OLT interface unit receives a data signal from the OLT of the TDMA-PON and converts the data signal into a downstream data frame, the downstream data frame being a media access control (MAC) frame or a GPON transmission convergence (GTC) frame based on a transmission protocol.

9. An optical network terminal (ONT) of a converged passive optical network (CPON) that is a combination of a time division multiple access-passive optical network (TDMA-PON) and an orthogonal frequency division multiple access-passive optical network (OFDMA-PON), the ONT comprising:
   an OFDM modem to transmit and receive an OFDM frame to and from an optical line terminal (OLT) through an optical link;
   an OFDM frame processing unit to process an OFDM frame corresponding to each of a plurality of services;
   a subcarrier queue transmission unit to process a subcarrier queue corresponding to each of the plurality of services; and
   an ONT interface unit to be matched with an ONT of the TDMA-PON corresponding to each of the plurality of services,
   wherein the OFDM frame processing unit comprises
   a first frame conversion unit to convert an OFDM downstream frame transmitted through a subcarrier into a data frame associated with a service of the TDMA-PON, and
   a second frame conversion unit to convert a data frame associated with a service of the TDMA-PON into an OFDM frame for upstream transmission.

10. The ONT of claim 9, wherein the OFDM modem comprises:
   a modulator/demodulator to modulate or demodulate the OFDM frame;
   a parallel-serial conversion unit to convert a signal between a parallel signal and a serial signal;
   a digital-analog conversion unit to convert a signal between a digital signal and an analog signal; and
   a photoelectric conversion unit to convert a signal between an electrical signal and an optical signal.

11. The ONT of claim 9, wherein the first frame conversion unit converts the OFDM frame into the data frame by eliminating overhead information from the OFDM frame, and the second conversion unit converts the data frame into the OFDM frame by adding the overhead information to the data frame.

12. The ONT of claim 11, wherein the overhead information comprises at least one of start delimiter information and end delimiter information about extraction of the OFDM frame, bit interleaved parity (BIP) information to measure a bit error rate (BER) of a downstream link, bitmap information about a subcarrier usable by an ONT according to the services, a service type, and an ONT identification (ID).

13. The ONT of claim 9, wherein the subcarrier queue transmission unit comprises:
   a downstream subcarrier queue processing unit to transmit a downstream subcarrier queue associated with a service of the TDMA-PON to a media access control (MAC) transmission unit of the TDMA-PON; and
   an upstream subcarrier queue processing unit to receive an upstream subcarrier queue associated with a service of the TDMA-PON from an MAC reception unit of the TDMA-PON.

14. The ONT of claim 9, wherein the ONT interface unit comprises:
   an MAC transmission unit to transmit a downstream subcarrier queue to a matched ONT of the TDMA-PON;
   an MAC reception unit to receive an upstream subcarrier queue from a matched ONT of the TDMA-PON; and
   a subcarrier allocation unit to select a subcarrier based on information about a subcarrier allocated by the OLT of the OFDMA-PON and a status of an upstream subcarrier queue of an ONT.

* * * * *